United States Patent
Zenke

(10) Patent No.: US 6,289,264 B1
(45) Date of Patent: Sep. 11, 2001

(54) DEBUGGING SYSTEM FOR ROBOT PROGRAMS

(75) Inventor: Hideo Zenke, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/604,321

(22) Filed: Jun. 27, 2000

(30) Foreign Application Priority Data

Feb. 23, 2000 (JP) .................................... 12-45761

(51) Int. Cl.[7] .................................................... G06F 19/00
(52) U.S. Cl. ................... 700/245; 700/247; 700/249; 700/255; 700/257; 700/259; 700/264; 318/568.1; 901/7; 901/8; 29/712; 701/23; 345/473
(58) Field of Search .................................... 700/245, 259, 700/97, 165, 95, 104, 255, 249, 257, 247, 264, 87; 318/568.1; 901/7, 8; 29/712; 701/23; 345/473, 967; 717/7

(56) References Cited

FOREIGN PATENT DOCUMENTS

| HEI 4-332052 | 11/1992 | (JP) . |
| HEI 7-224211 | 12/1995 | (JP) . |

*Primary Examiner*—William A. Cuchlinski, Jr.
*Assistant Examiner*—McDieunel Marc
(74) *Attorney, Agent, or Firm*—Sughrue, Mion, Zinn, Macpeak & Seas, PLLC

(57) ABSTRACT

A debugging system in which, when any trouble occurs in robot program using variables and debugging is to be performed, a specific variable as the probable cause of the trouble and a relevant reference variable are specified, and presence or absence of the specific variable in the called-up robot program is detected. When any specific variable appears, the values of the specific variable and the reference variables are acquired and displayed together with the robot program information.

7 Claims, 15 Drawing Sheets

FIG.2

PURSUIT INFORMATION

| ITEM | DATA |
|---|---|
| SPECIFIC VARIABLE NAME | A |
| ITERATION OMISSION MODE | OFF |
| THE NUMBER OF REFERENCE VARIABLES | 2 |
| REFERENCE VARIABLE NAME 1 | B |
| REFERENCE VARIABLE NAME 2 | C |

FIG.3

TRACE INFORMATION

| TRACE NUMBER | PROGRAM ADDRESS | | SPECIFIC VARIABLE A | REFERENCE VARIABLE B | REFERENCE VARIABLE C |
|---|---|---|---|---|---|
| | PROGRAM NUMBER | STEP NUMBER | | | |
| 1 | PN1 | PS1 | D1 | D101 | D201 |
| 2 | PN2 | PS2 | D2 | D102 | D202 |
| 3 | PN3 | PS3 | D3 | D103 | D203 |
| 4 | PN4 | PS4 | D4 | D104 | D204 |
| 5 | PN5 | PS5 | D5 | D105 | D205 |

FIG.8

TRACE INFORMATION

| TRACE NUMBER | PROGRAM ADDRESS | | SPECIFIC VARIABLE A | REFERENCE VARIABLE B | REFERENCE VARIABLE C |
|---|---|---|---|---|---|
| | PROGRAM NUMBER | STEP NUMBER | | | |
| 1 | PN1 | PS1 | D1 | D101 | D201 |
| 2 | ... | PS2 | ... | D102 | ... |
| 3 | ... | PS3 | D3 | ... | ... |
| 4 | PN4 | PS4 | ... | ... | ... |
| 5 | PN5 | PS5 | ... | ... | ... |

FIG.9

COMPARISON BUFFER 61

| TRACE NUMBER | PROGRAM ADDRESS | | | SPECIFIC VARIABLE A | REFERENCE VARIABLE B | REFERENCE VARIABLE C |
|---|---|---|---|---|---|---|
| | PROGRAM NUMBER | STEP NUMBER | | | | |
| 1 | PN1 | PS1 | | D1 | D101 | D201 |

FIG.10

TEMPORARY BUFFER 62

| TRACE NUMBER | PROGRAM ADDRESS | | | SPECIFIC VARIABLE A | REFERENCE VARIABLE B | REFERENCE VARIABLE C |
|---|---|---|---|---|---|---|
| | PROGRAM NUMBER | STEP NUMBER | | | | |
| 2 | PN1 | PS2 | | D1 | D102 | D201 |

FIG.12

TRACE INFORMATION

| TRACE NUMBER | PROGRAM ADDRESS | | SPECIFIC VARIABLE A | REFERENCE VARIABLE B | REFERENCE VARIABLE C |
|---|---|---|---|---|---|
| | PROGRAM NUMBER | STEP NUMBER | | | |
| 1 | PN1 | PS1 | D1 | D101 | D201 |
| 2 | PN1 | PS2 | D1 | D102 | D201 |
| 3 | PN1 | PS3 | D3 | D102 | D201 |
| 4 | PN4 | PS4 | D3 | D102 | D201 |
| 5 | PN5 | PS5 | D3 | D102 | D201 |

FIG.13

PURSUIT INFORMATION

| ITEM | DATA |
|---|---|
| SPECIFIC VARIABLE NAME | A |
| SPECIFIC VARIABLE ADDRESS | addr (A) |
| SPECIFIC VARIABLE TYPE | POSITION VARIABLE |
| SPECIFIC VARIABLE DATA LENGTH | 24 BYTES |
| ITERATION OMISSION MODE | ON |
| OMISSION START LINE | 4 |
| OMISSION END LINE | 7 |
| THE NUMBER OF REFERENCE VARIABLES | 0 |

FIG.14

| 1 | *MAIN | |
|---|---|---|
| 2 | DEF POS A | DEFINE A POSITION VARIABLE A (REFERENCE POSITION) |
| 3 | DIM P(100) | DEFINE AN ARRAY POSITION VARIABLE P (OPERATING POSITION) |
| 4 | FOR M1=1 TO 100 | CALCULATE DATA FOR POSITIONS FROM OPERATING POSITION 1 TO 100 |
| 5 | P(M1)=A | COPY REFERENCE POSITION TO OPERATING POSITION |
| 6 | P(M1)=P(M1).x+10 * M1 | SET A STROKE FROM THE REFERENCE POSITION |
| 7 | NEXT M1 | |
| 8 | MOV A | MOVE ROBOT TO REFERENCE POSITION A |
| 9 | FOR M2=1 TO 100 | |
| 10 | MOV P(M2) | MOVE FROM THE PREVIOUSLY MOVED POSITION TO TARGET POSITION |
| 11 | NEXT M2 | |
| 12 | MOV A | MOVE TO REFERENCE POSITION |
| 13 | END | |

TRACE INFORMATION

| TRACE NUMBER | PROGRAM ADDRESS | | VARIABLE A |
|---|---|---|---|
| | PROGRAM NUMBER | STEP NUMBER | |
| 1 | PN1 | PS1 | D1 |
| 2 | PN2 | PS2 | D2 |
| 3 | PN3 | PS3 | D3 |
| 4 | PN4 | PS4 | D4 |

DEBUGGING SYSTEM FOR ROBOT PROGRAMS

FIELD OF THE INVENTION

The present invention relates to a debugging system for robot program. More specifically, this invention relates to a debugging system which, stores in memory program information and variable information when any variable is defined or referred to during debugging of a robot program, and displays the stored program information and variable information on a monitoring device.

BACKGROUND OF THE INVENTION

FIG. 16 is a block diagram showing a conventional programmable controller disclosed in Japanese patent application laid open No. 07-334211. As shown in this figure, the programmable controller 10 comprises a processor 11 and memory 13, and is connected to a monitoring device 20. The monitoring device 20 is used for setting data required by the programmable controller 10 and also displaying the data. The processor 11 is connected to the memory 13. The processor 11 has a debugging interruption function like Intel-produced 80486, and also has a built-in debugging register 19. The debugging register 19 can generate debugging interruption, if an arbitrary address of data is set, immediately after the address is accessed. The memory 13 stores program in a program area 14, variables in a variable area 15, and trace data in a trace area 17.

The operation of the controller is explained below with reference to FIG. 17. FIG. 17 shows a frame example of the monitoring device 20. Reference numeral PN1 to PN4 represent program numbers, PS1 to PS4 represent step numbers, and D1 to D4 represent values of a variable. FIG. 17 shows the case where four types of trace data (which are indicated by trance numbers 1 to 4) are included in one variable name A. The user of the programmable controller sets a variable name while viewing the screen of the monitoring device 20. The set variable is converted into an absolute address that is processor 11-recognizable by the operating system, and set in the debugging register 19. The program are repeatedly executed by the operating system at constantly cycled time intervals. When the access is made to the address set in the debugging register 19 during execution of the program, the processor 11 generates debugging interruption. The operating system reads out the program number (PN1 to PN4) of the program that is currently operating, the program step number (PS1 to PS4), and the values (D1 to D4) of the accessed variable within the debugging interrupt handler, and stores the read-out data in the trace buffer 17. The monitoring device 20 reads out the data in the trace area 17 of the memory 13, and displays the data on the screen of the monitoring device 20.

Even if the programmable controller technology disclosed in the Japanese patent application laid open No. 07-334211 is employed for a robot controller having a large number of variables as explained above, it is required to repeat debugging a plurality of times according to the variables if there are many specific variables that have trouble. Therefore, a lot of time is required for trouble shooting.

Like the program debugging method disclosed in Japanese patent application laid open No. 04-332052, there is another technology that compiles a source program to create a load module file and pursuit information file and specifies a plurality of variables to be displayed. According to this method, however, various types of file and table are created at once. Therefore, there is a problem that a large memory capacity is required.

SUMMARY OF THE INVENTION

It is an object of this invention to provide a debugging system that is excellent in efficiency based on a smaller number of iterations of debugging, as compared to the conventional technology disclosed in Japanese patent application laid open No. 07-334211.

It is another object of this invention to provide a debugging system that can debug with a smaller amount of memory space without preparation of a plurality of files and tables, as compared to the debugging method disclosed in Japanese patent application laid open No. 04-332052.

It is still another object of this invention to provide a debugging system that is excellent in the efficiency for memory by enabling controls of writing in a trace area when there is a syntax (for-or next-statement) which is repeatedly executed a plurality of times in the robot program.

It is still another object of this invention to provide a debugging system that is excellent in the efficiency of memory by specifying line numbers or program numbers and step numbers in the robot program as a range where debugging is omitted.

According to one aspect of this invention, any variable, as an object to be debugged, other than a specific variable can also be specified as a reference variable. When the specific variable is accessed, the values of the specific variable and the reference variable are read out from memory. The values are then stored as trace information in memory together with robot program information. A display unit refers to and displays the stored trace information.

Further, when access is made to any one of a plurality of specific variables, the values of the specific variable and the reference variable are read out from the memory. The values are then stored as trace information in the memory together with the robot program information. The display unit refers to and displays the stored trace information.

Further, when access is made to a specific variable, the values of the specific variable and the reference variable are read out from the memory. When the robot program information and the values of the specific variable and the reference variable are the same as those acquired in the previous reading, the data is stored in the memory as trace information by using character strings each with a short data length. The display unit refers to and displays the stored trace information.

Further, a reconstruction unit reconstructs the trace information, that has been stored in the memory by using the character strings each with a short data length in the above invention, to the values which are not abbreviated, and displays the values.

Further, an iteration-omission selection unit selects whether tracing the robot program for the iteration part is executed or omitted.

Further, a line selection unit specifies a range from a start line to an end line of the robot program, and selects whether tracing the range is executed or omitted.

Further, a program selection unit specifies a range of program numbers and step numbers of the robot program, and selects whether tracing the range is executed or omitted.

Other objects and features of this invention will become apparent from the following description with reference to the accompanying drawings.

BRIEF DESCRIPTION OF THE DRAWINGS

FIG. 2 shows data stored in a pursuit information area, which is required for debugging in the first embodiment;

FIG. 3 shows data stored in a trace area in the first embodiment;

FIG. 8 shows data stored in a trace area in the second embodiment;

FIG. 9 shows data stored in a comparison buffer in the second embodiment;

FIG. 10 shows a temporary buffer which stores data currently being acquired in the second embodiment;

FIG. 12 shows trace information in the third embodiment;

FIG. 13 shows data stored in a pursuit information area in a fourth embodiment;

FIG. 14 shows a robot program in the fourth embodiment and explanation of the program;

DESCRIPTION OF THE PREFERRED EMBODIMENTS

Figure 1:
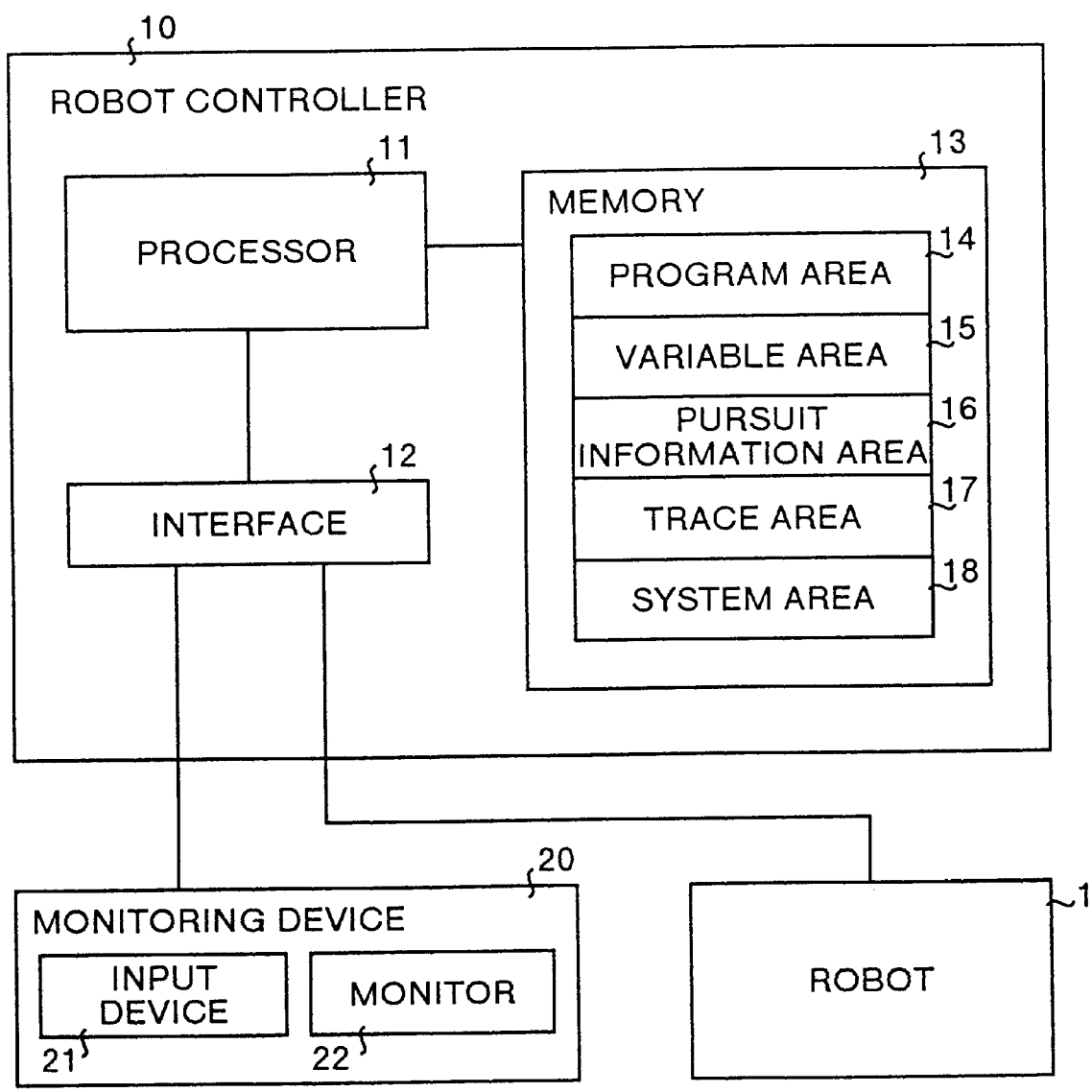
FIG. 1 is a block diagram of a robot controller and a monitoring device showing a first embodiment.

FIG. 1 is a block diagram of a robot controller and a monitoring device according to a first embodiment of this invention. As shown in this figure, the robot controller 10 is connected to a robot 1 and a monitoring device 20. The robot controller 10 controls the robot 1.

This robot controller 10 comprises a processor 11, an interface 12, and memory 13. The memory 13 consists of a program area 14 that stores a robot program input by an operator, a variable area 15 that stores variables used by a maker or a user, and a pursuit information area 16 that stores debugging information. The memory 13 further consists of a trace area 17 that stores the information obtained during debugging, and a system area 18 that stores a basic program used for executing the robot program and controlling each section of the robot controller 10.

The monitoring device 20 comprises an input device 21 such as a keyboard and a mouse, a monitor 22. Although not shown in this figure, the monitoring device 20 has other components such as a processor, memory, and an interface. Any ordinary personal computer with a CRT may be used as this monitoring device 20.

FIG. 2 shows data stored in the pursuit information area 16, which is required for debugging of the robot program. The stored data is edited and input through the input device 21 and displayed on the monitor 22. The pursuit information includes information about specific variable names that are specified as the most important ones for debugging, and ON/OFF information about iteration omission mode. The pursuit information further includes information about the number of reference variables to be referred to when a specific variable is accessed, and information about reference variable names. Concretely the pursuit information is as follows. Specific variable name=A, iteration omission mode=OFF, the number of reference variables=2, reference variable name 1=B, and reference variable name 2=C.

FIG. 3 shows data stored in the trace area 17, and a table like this is displayed on the monitor 22. Reference numerals 1 to 5 on the left represent trace numbers, which correspond to times the specific variable A has been accessed. Reference numerals PN1 to PN5 represent program number of the robot program and PS1 to PS5 represent step numbers, which are referred to as robot program information. Reference numerals D1 to D5 represent the values of the specific variable A, D101 to D105 represent the values of the reference variable B, and D201 to D205 represent the values of the reference variable C. FIG. 3 shows the case where the trace information for the specific variable A has appeared five times.

Figure 4:
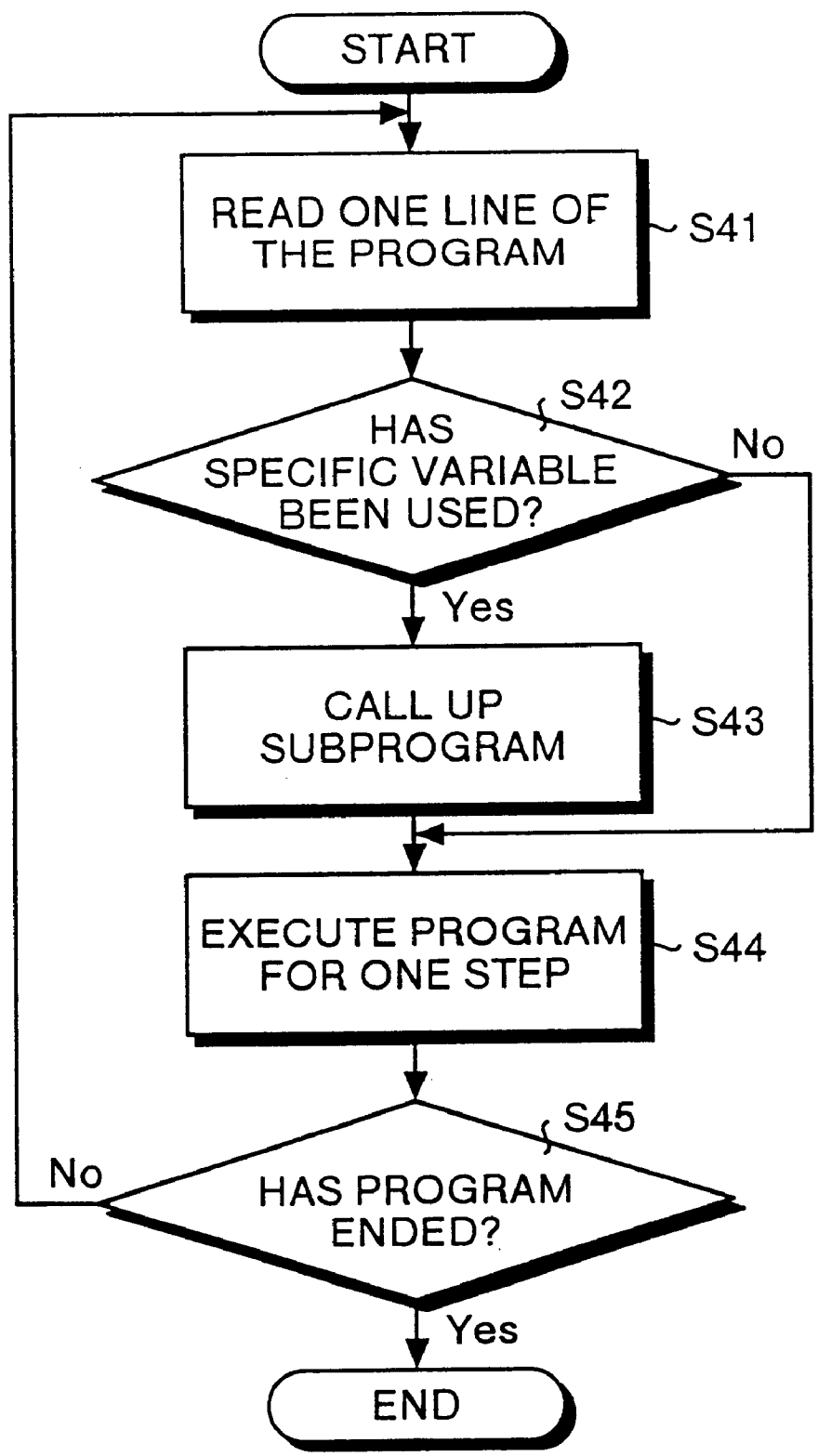
FIG. 4 is a flow chart of a main program showing the first embodiment.
Figure 5:
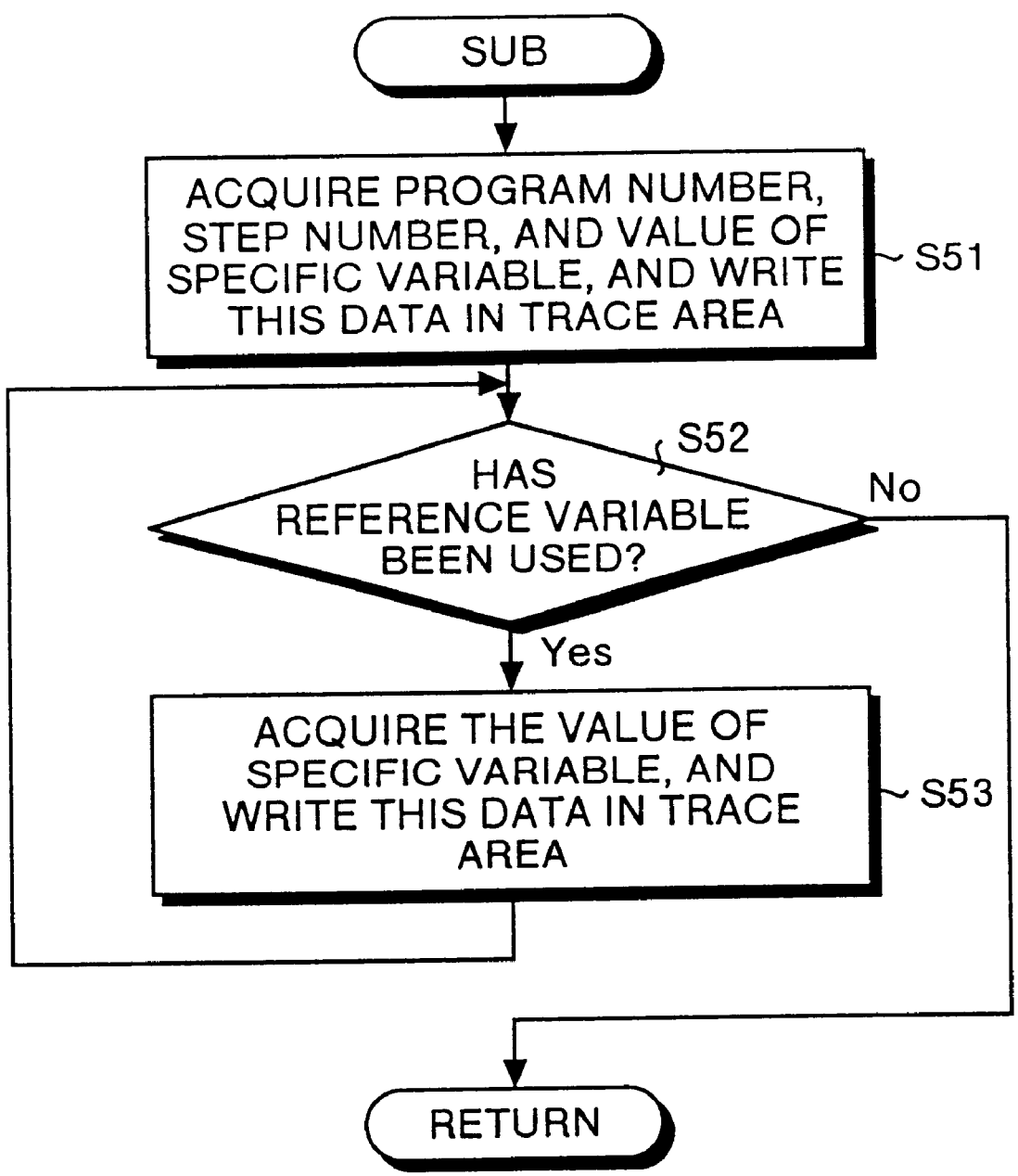
FIG. 5 is a flow chart of a subprogram showing the first embodiment.

Operation of the robot controller 10 will be explained below with reference to FIG. 4 and FIG. 5. FIG. 4 shows a flow chart of a main program with which debug processing of the robot program is performed. FIG. 5 shows a flow chart of a subprogram for the debug processing.

When debugging the robot program, the operator sets the pursuit information using the input device 21. That is, the operator sets, for example, the specific variable A that is the probable cause of trouble within the robot program in which the trouble has occurred while viewing the screen shown in FIG. 2 on the monitor 22. The operator further sets the reference variable B and the reference variable C that are the probable secondary cause of the trouble. The operators then executes the robot program so as to debug the program. The processor 11 reads a line of the robot program at step S41. At step S42, the processor 11 determines whether the specific variable A has been used in the robot program. When the variable A has not been used, the system control proceeds to step S44. At step S44, the line of robot program is executed and processed by the processor 11 and the interface 12 in the robot controller 10. Namely, driving the robot 1 is controlled, or data in the memory 13 of the robot controller 10 is updated. At step S45, the processor 11 determines whether the entire robot program has been processed or not. If the entire robot program has not been processed, the system control returns to step S41 and the process in steps S41 to S45 is repeated.

At step S42, when it is determined that the specific variable A has been used in the robot program, the system control proceeds to step S43. In step S43 the subprogram shown in FIG. 5 is calledup and executed. At step S51 in FIG. 5, the processor 11 acquires the value D1 of the specific variableA in the pursuit information, and writes the value in the trace area 17 together with the program number PN1 and the step number PS1 in the robot program information, and the trace number. At step S52, the processor 11 determines whether there is a reference variable in the pursuit information. In this case, since there is the reference variable B set in the pursuit information the system control proceeds to step S53. At step S53, the processor 11 acquires the value D101 of the reference variable B and writes the value in the trace area 17. After this step, the system control is returned to step S52. In this case, since the reference variable C has also been set in the pursuit information the system control proceeds to step S53. At step S53, this time, the processor 11 acquires the value D201 of the reference variable B, and writes the value in the trace area 17. After this step, the system control is returned to step S52. At step S52, this time, since there is no more reference variable set in the pursuit information the process is terminated. That is, the system control proceeds to step S44 in FIG. 4.

Thus, the subprogram shown in FIG. 5 is executed each time the specific variable A is used until the entire robot program is processed. The trace numbers, the program numbers, the step numbers, the values of the specific variable A, the values of the specific variable B, and the values of the specific variable C are then stored in the trace area 17 as trace information.

The trace information in the trace area 17, on the other hand, is transmitted also to the monitoring device 20. The table of the trace information shown in FIG. 3 is displayed on the screen of the monitor 22.

The operator then analyzes the trouble while referring to the trace information appearing on the screen of the monitor 22. If there is not enough data required for the analysis of the trouble, the operator changes the setting of the specific variables and the reference variables in the pursuit information and executes the robot program again to enable further analysis of the trouble.

Although the case of using one specific variable has been explained referring to FIG. 2, it is also possible to set many of such specific variables. When any one of the specific variables is used in the robot program, debugging can be executed a smaller number of times by performing the trace processing to the other specific variables and the reference variables, thus debugging efficiency can be improved.

Although the case of specifying the number of reference variables as pursuit information in FIG. 2 has been explained, the processor 11 may count the number of entries of the reference variable names to perform the trace processing so that the operator can omit the processing for entering the number of reference variables.

The second embodiment of this invention is explained below. The second embodiment is programmed to compare, when data about trace information is acquired by accessing the specific variable in the first embodiment, the data with the previously acquired data, convert only the same data to each simple character string, and write the strings in the trace area 17. The flow chart of the main program in FIG. 4 is the same as that of the first embodiment, therefore, explanation of the flow chart is omitted.

Figure 6:
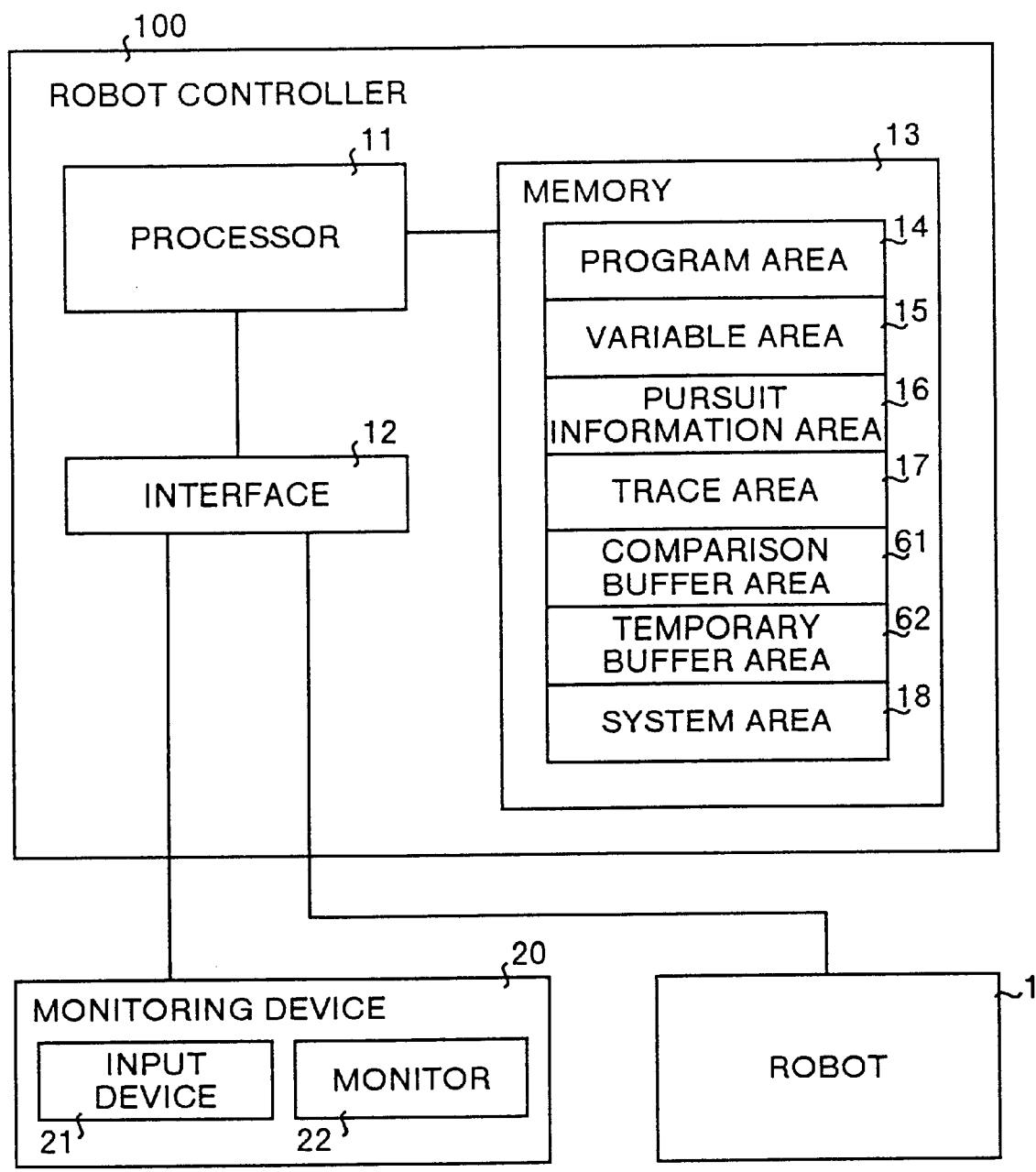
FIG. 6 is a block diagram of a robot controller and a monitoring device showing a second embodiment.

The second embodiment is explained below with reference to FIG. 6 to FIG. 10. FIG. 6 is a block diagram showing the robot controller 100 and the monitoring device 20 according to the second embodiment. In FIG. 6, reference numeral 61 represents a comparison buffer which is provided in the memory 13, stores the values of variables that are acquired for debugging, and compares the values with values that are acquired next time. Reference numeral 62 represents a temporary buffer which is provided in the memory 13, and stores the data currently being acquired. The other parts of the configuration are the same as those in the first embodiment, therefore, explanation is omitted.

Figure 7:
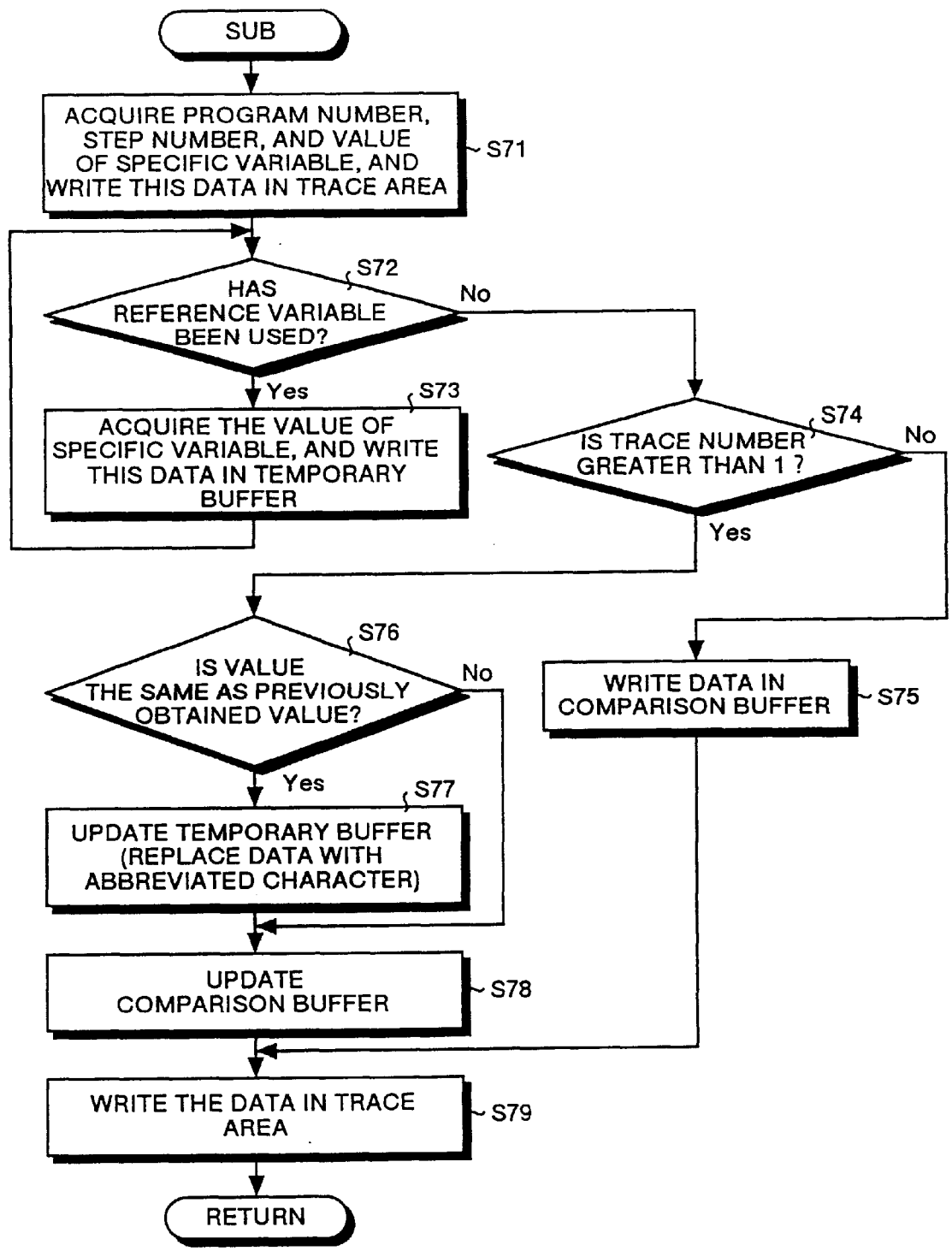
FIG. 7 is a flow chart of a subprogram showing the second embodiment.

FIG. 7 is a flow chart of a subprogram in the second embodiment. FIG. 8 shows the trace information that is stored in the trace area 17 and displayed on the screen of the monitor 22. FIG. 9 shows the data stored in the comparison buffer 61 of the memory 13. FIG. 10 shows the data in the temporary buffer 62 of the memory 13.

Operation of the robot controller 100 will be explained below. The following explanation is based on the assumption that the pursuit information shown in FIG. 2 of the first embodiment is used as it is as the pursuit information and the trace information shown in FIG. 8 is obtained as the result of debugging.

When the debugging is started, the processor 11 reads a line of robot program at step S41 in FIG. 4. At step S42, the processor 11 determines that the specific variable A has been used and the system control proceeds to step S43. In step S43, the subprogram shown in FIG. 7 is called up and executed. At step S71, the processor 11 acquires the value D1 of the specific variable A in the pursuit information, and writes the value in the temporary buffer 62 together with the program number PN1 and the step number PS1 in the robot program information, and the trace number 1. At step S72, the processor 11 determines whether any reference variable is included in the pursuit information. Since the reference variable B is specified as the pursuit information, the system control proceeds to step S73. The processor 11 acquires the value D101 of the reference variable B and writes the value in the temporary buffer 62. The system control is then returned to step S72. Further, since the reference variable C has been specified, the system control proceeds to step S73. In step S73, the processor 11 acquires the value D201 of the reference variable C, and writes the value in the temporary buffer 62. The system control is then returned to step S72. From step S72 the system control proceeds to step S74 since there is no any other reference variables. At step S74, it is determined that the trace number is 1, namely, the first processing is to be performed after the tracing is started. Therefore, the system control proceeds to step S75. In step S75, the processor 11 rewrites the data in the comparison buffer 61 with the data stored in the temporary buffer 62. The system control then proceeds to step S79. In step S79, the processor 11 writes the data stored in the temporary buffer 62 in the trace area 17. The processor 11 then exits the subprogram, executes another line of the robot program at step S44. At step S45, the processor 11 determines whether the entire robot program has been processed or not. If the entire robot program has not been processed, the system control returns to step S41 and the process in steps S41 to S45 is repeated. When the robot program in which the specific variable A has been used is read again at step S41 during repetition of the processing, the system control proceeds to step S42 and then to step S43, and the subprogram in FIG. 7 is called up and executed again.

In the same manner as explained above, the processing from step S71 to step S73 is repeated, and the trace number 2, the program number PN1, the step number PS2, the value D1 of the specific variable A, the D102 of the reference variable B, and the value D201 of the reference variable C are stored in the temporary buffer 62. When all the values of variables in the pursuit information are acquired, the system control proceeds to step S74. Since the trace number is 2, the system control proceeds to step S76. In step S76, the processor 11 compares the values in the comparison buffer 61 with those in the temporary buffer 62, respectively. That is, the data in the comparison buffer 61 shown in FIG. 9 is compared with the data in the temporary buffer 62 shown in FIG. 10. It is determined that the program numbers, and the values of the specific variable A and reference variable C between the two buffers are the same as each other, therefore, the system control proceeds to step S77. The processor 11 then changes the program numbers and the values of the specific variable A and the reference variable C in the temporary buffer 62 to 1-byte character ":". At step S78, referring to any step number different from the previous one and the reference variable B, the step number and the value of the reference variable B in the comparison buffer 62 are replaced with the values in the temporary buffer 62. Resultantly, the latest real values are stored in the comparison buffer 62. The system control proceeds to step S79. In step S79, the processor 11 writes the data from the temporary buffer 62 into the trace area 17 as trace information, and exits the subprogram.

The comparison buffer and the temporary buffer are explained below with reference to the specific data in FIG. 9 and FIG. 10. Since the program number, the specific variable A, and the reference variable C in the trace number 2 are the same as those in the trace number 1, the data in the temporary buffer 62 is replaced with the character string "2, :, PS2, :, D102, :" at step S77. This character string is then stored in the trace area 17 at step S79. The step number and the value of the reference variable B in the comparison buffer 61 are updated, and the final data remains in the comparison buffer 61 as "2, PN1, PS2, D1, D102, D201".

At step S76, if all the data between the two buffers are different from each other, the system control proceeds to step S78. In step S78 processor 11 replaces the data in the comparison buffer 61 with the data in the temporary buffer 62. At step S79, the processor 11 writes the data for the temporary buffer 62 in the trace area 17 as trace information, and exits the subprogram.

On the other hand, the trace information in the trace area 17 is transmitted also to the monitoring device 20 and displayed on the monitor 22 as the table shown in FIG. 8. Therefore, the operator can analyze the trouble while referring to the trace information appearing on the screen of the monitor 22.

Although the operation has been explained using the temporary buffer 62, it is also possible to perform debugging without the temporary buffer 62 based on the condition as follows. The processor 11 is configured to directly compare the value of the accessed specific variable or the reference variable with that in the comparison buffer 61, and directly write the value in the trace area 17 using a character string with a short data length when these values are the same as each other.

For debugging robot program, a bigger trace area is required if the values of variables are stored every time as they are. However, the contents of variables do not always change, which means that the values are in many cases are the same as those acquired in the previous access. For example, a position variable to indicate the operating position of a robot requires six-degree-of-freedom element data in order to represent one variable (4 bytes). Therefore, the trace area with 4 bytes×6=24 bytes is required. As shown in FIG. 8, it is assumed that the reference variable C is the position variable and the contents of the specific variable A do not change during tracing for five times from the beginning to the end of execution. Based on the above assumption, the trace area with 24 bytes×5 times=120 bytes is required. In contrast to this, assuming that the values of the specific variable A are the same as each other, namely the values do not change in five times, and if the 1-byte abbreviated character ":" is assigned to the same value, only 24 bytes of the initial values and 4 bytes of the assigned characters for the remaining four times may be required for the area, which allows the robot program to be debugged within the trace area for 28 bytes even in total.

The third embodiment is explained below. The third embodiment is realized by reconstructing the trace information, that has been stored by using the abbreviated characters in the second embodiment as shown in FIG. 8, to the full-length values and displaying the values on the monitoring device.

Figure 11:
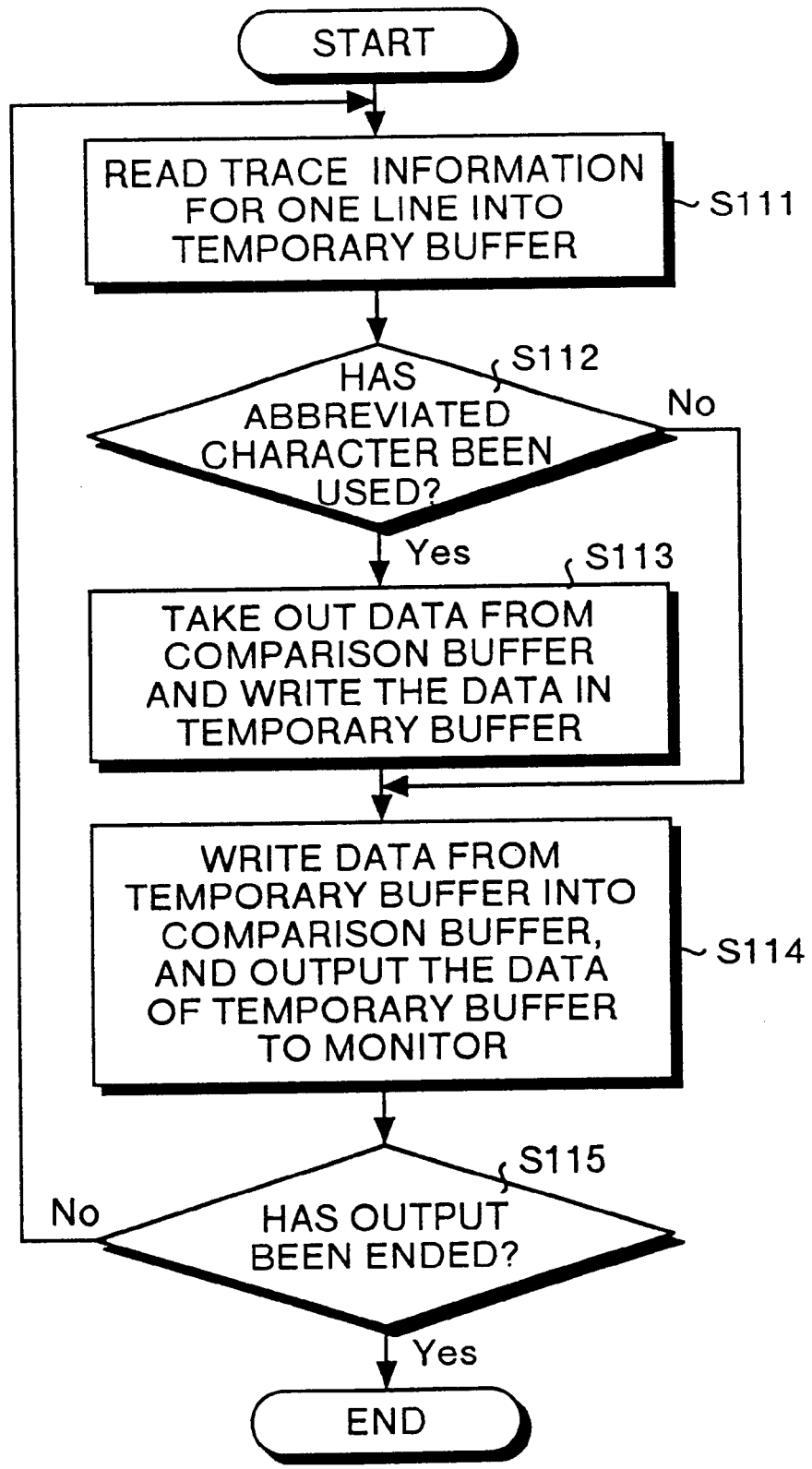
FIG. 11 is a flow chart of a program showing a third embodiment.

FIG. 11 shows a flow chart of a program which is integrated in the system area 18 of the memory 13 (see FIG. 6) and performs reconstruction of the trace information. FIG. 12 shows the trace information that has been reconstructed and is displayed on the monitor 22 of the monitoring device 20.

The processing for reconstructing and displaying the trace information is explained below with reference to the flow chart in FIG. 11. There is received an instruction to display the trace information, stored using the abbreviated characters, without the abbreviated characters through the input device 21 by the operator. In response to reception of the instruction, the processor 11 takes out the information for the line of trace number 1 from the trace area and stores the information in the temporary buffer 62 at step S111. Concretely, the program number PN1, the step number PS1, the value D1 of the specific variable A, the value D101 of the reference variable B, and the value D201 of the reference variable C are stored in the temporary buffer 62. At step S112, the processor 11 determines whether the abbreviated character ":" has been used in the temporary buffer 62. When the abbreviated character has not been used, the system control proceeds to step S114. At step S114, the processor 11 writes the data from the temporary buffer 62 into the comparison buffer 61, and performs the processing so as to display the data for the temporary buffer 62 on the monitor 22 of the monitoring device 20. At step S115, the processor 11 determines whether the display of the trace information has been ended. When the display has not been ended, the system control is returned to step S111. Thus, the process in steps S111 to S115 is repeated.

At step S112, when the abbreviated sign ":" has been used in the data stored in the temporary buffer 62 like the data of trace number 2 in FIG. 8, the system control proceeds to step S113. In step S113, the processor 11 replaces the abbreviated sign ":" in the temporary buffer 62 with the data fetched from the comparison buffer 61, namely with the program number PN1, the value D1 of the specific variable A, and the value D201 of the reference variable C. The system control proceeds to step S114. Thus, finally, the real values without the abbreviated sign ":" are displayed on the monitor 22 as shown in FIG. 12.

The fourth embodiment is explained below with reference to FIG. 13 to FIG. 15. In this fourth embodiment, any part which does not require debugging can be specified in the robot program where the variable has been used based on the configuration according to the first through third embodiments. That is, this embodiment is aimed at reducing the trace area 17 in the memory 13.

FIG. 13 shows data stored in the pursuit information area 16, in other words, the items required for debugging robot program. As compared to FIG. 2 shown in the first embodiment, the information for a specific variable address, a specific variable type, a specific variable data length, an iteration omission mode, an omission start line, and an omission end line is added to the items in FIG. 2. The address, the type, and the data length as the specific variable information are the items managed by the processor 11. Therefore, when any specific variable is specified, these items can automatically be display on the screen to allow the operator to make sure the type of the variable or the like. The stored data is edited through the input device 21 and displayed also on the monitor 22 like FIG. 13. The specific pursuit information in FIG. 13 is as follow: specific variable name to be checked=A, iteration omission mode of the robot program=ON, omission start line of the robot program=4, and omission end line of the robot program=7.

FIG. 14 shows the robot program as an object for debugging based on the pursuit information, and explanation of the program. Although the figure shows program lines, robot program, and explanation of the contents of each instruction in the order presented from the left column, the actual program area 14 of the robot controller 10 stores the program lines and the robot program. The program lines and the robot program are displayed also on the monitor 22 based on the instruction through the input device 21 so that the contents can be checked.

The meaning of every line in the robot program is as follows.

The program name declaration (first line),
definition of a position variable A representing the reference position of the operation (second line),
definition of a variable P (100) at 100 target positions of the operation as an array variable (third line),
instruction for iterations from M1=1 to 100 to the range up to the seventh line (fourth line),
assignment of A to the operation target position P (M1) (fifth line),
assignment of the value obtained by adding 10 mm*M1 in the X direction to the reference position A to P (M1) (sixth line),
proceed to the eighth line if M1 is greater than 100, and proceed to the fourth line if M1 is equal to 100 or less (seventh line),
move the robot to the reference position A (eighth line)
instruction for iterations from M2=1 to 100 to the range up to the 11th line (ninth line)
move the robot to the operation target position P (M2) (10th line)
proceed to the 12th line if M2 is greater than 100, and proceed to the ninth line if M2 is equal to 100 or less (11th line),
move the robot to the reference position A (12th line), and
the program ends (13th line).

This program indicates the contents in which the robot is moved from the reference position A to positions in the X direction 100 times 10 mm by 10 mm, and returned to the reference position A to end the program.

Figure 15:
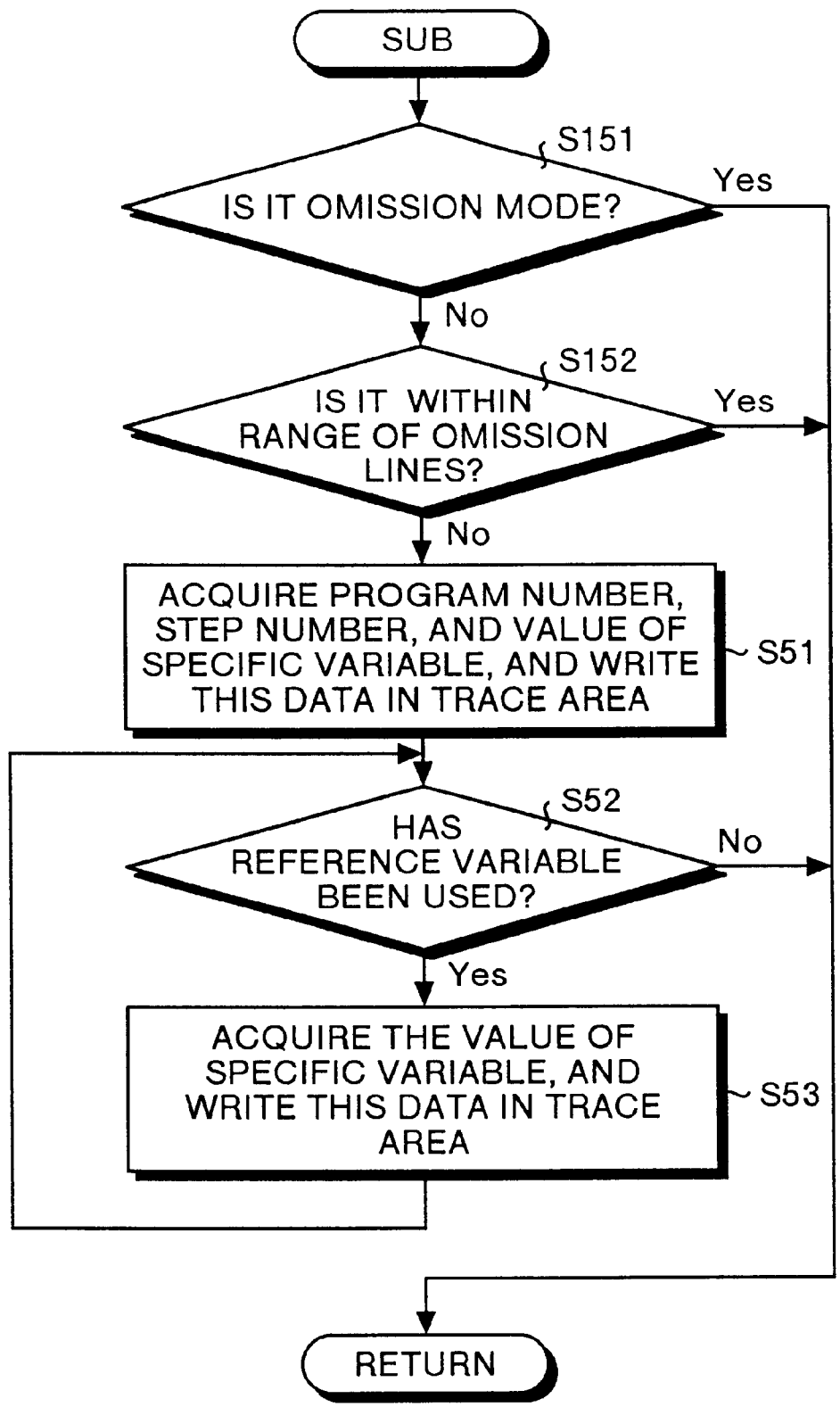
FIG. 15 is a flow chart of a subprogram showing the fourth embodiment.
Figures 16, 17:
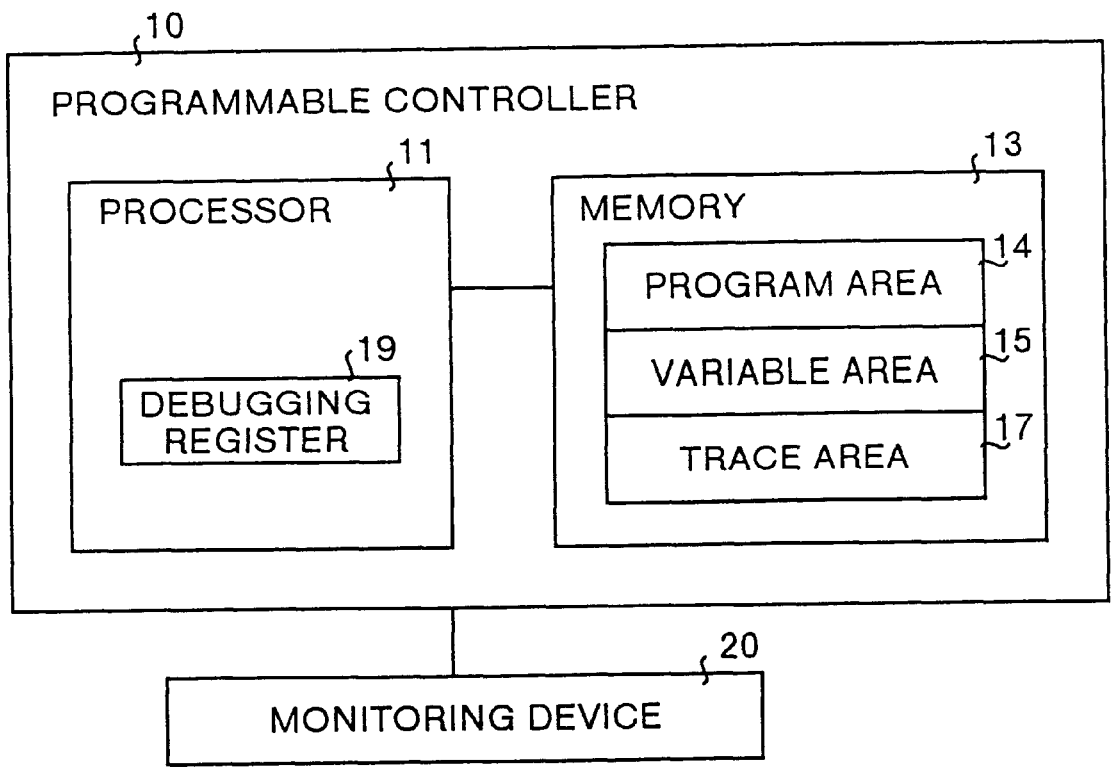
FIG. 16 is a block diagram of the conventional programmable controller.
FIG. 17 shows a frame of the monitoring device 20 for the conventional programmable controller.

FIG. 15 is a flow chart of a subprogram, which is obtained by adding a decision function to the part of the subprogram in FIG. 5. The main program to be explained here is the same as that of FIG. 4.

The operation is explained below based on the pursuit information in FIG. 13, the robot program in FIG. 14, and the flow chart in FIG. 15.

For debugging robot program, the operator sets, while viewing the frame shown in FIG. 13 appearing on the monitor 22, the specific variable A that is the probable cause of the trouble, iteration omission mode=ON, omission start line=4, and omission end line=7 as trace auxiliary data from the robot program where the trouble has occurred through the input device 21. The robot program shown in FIG. 14 in which the trouble has occurred are executed for debugging, and the processor 11 reads the robot program for one line at step S41. At step S42, the processor 11 determines whether the specific variable A has been used in the robot program. When the variable A has not been used, the system control proceeds to step S44. Thus, the processing is performed in the same manner as that in the first embodiment.

At step S42, it is determined that the specific variable A has been used in the robot program, the system control proceeds to step S43. At step S43, the processor 11 executes the subprogram shown in FIG. 15. At step S151, the processor 11 determines whether the iteration omission mode is ON. When the mode is ON, the processor 11 does not perform acquisition of data such as the specific variable and the reference variable in for- and next-statements, and exits the subprogram. When the mode is OFF, the system control proceeds to step S152. At step S152, the processor 11 determines whether the line is within the range from the omission start line to the omission end line. When the line is within the range, the processor 11 does not perform acquisition of data such as the specific variable and the reference variable, and exits the subprogram. On the other hand, when the line is not within the range, the system control proceeds to step S51. At step S51, the processor 11 performs the same trace processing as the operation in the first embodiment. Namely, the processor 11 acquires data for program numbers, step numbers, and specific variables and reference variables, and writes the data in the trace area 17. When the omission mode is ON, it is possible to prevent the operator from issuing an erroneous instruction on condition that it is programmed not to display an omission start line and an omission end line, or to disable data entry.

The information for iteration omission mode=OFF, omission start line=4, and omission end line=7 is set as trace auxiliary data through the input device 21 and debugging is executed. In this case, the processor 11 does not perform acquisition of the data for a reference variable and a reference variable within the fourth line to the seventh line of the robot program and exits the subprogram, thus, the tracing is not performed.

The information for iteration omission mode=OFF, omission start line=0, and omission end line=0 is set as trace auxiliary data through the input device 21 and debugging is executed. In this case, the processor 11 performs acquisition of the data for specific variables and reference variables each time the specific variable appears in the same manner as that in the first embodiment, and then the tracing is performed.

The tracing of the robot program within a specified range can be omitted. Namely, the omission is performed on condition that an omission start line and an omission end line are replaced with only omission-start and omission-end program numbers, or a combination of program numbers and step numbers, and omission is selectable from the input device 21.

Although the robot controller 10 and the monitoring device 20 are explained as discrete components in FIG. 1 and FIG. 6, any of or both of the input device 21 and the monitor 22 may be integrated with the robot controller 10.

The present invention is configured as explained above, thus, the advantageous effects as follows can be achieved.

According to one aspect of this invention, a plurality of specific variables and reference variables can be specified. When any specific variable has been accessed, the trace information is stored in memory and also output to the display unit. Therefore, the number of debugging times for the robot program can be reduced, which allows debugging efficiency to be improved.

Further, a plurality of specific variables can be specified. When any one of the specific variables has been accessed, tracing is performed. Therefore, the number of debugging times for the robot program can further be reduced, which allows debugging efficiency to be improved.

Further, when the robot program information, and the values of a specific variable and a reference variable are the same as those acquired in the previous time, the data is replaced with character string search with a short data length. Therefore, the trace area can be decreased, thus, the memory can be economized. Assuming that the trace area is constant, the time to debug can be prolonged.

Further, the robot program trace information, and the values of the specific variable and the reference variable, which have been replaced with character strings each with a short data length, are reconstructed to the original values and displayed. Therefore, the contents of the trace area can easily be confirmed.

Further, any part that does not require tracing can be specified in the robot program. Therefore, it is possible to more efficiently perform debugging and economize on memory usage.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A debugging system for robot program, which controls a robot based on instructions of robot program including variables by using a robot controller, and debugs the robot program, said debugging system comprising:

an input unit which inputs a specific variable name and a reference variable name as pursuit information for debugging;

a display unit which displays the pursuit information input by said input unit;

a memory unit which contains a variable area that stores the variables, a pursuit information area that stores the pursuit information, a trace area that stores the result of debugging, a robot program area that stores robot program entered by an operator, and a basic program area that stores program executed by a processor; and a specific variable detection unit which detects that the specific variable has been used in the robot program, wherein robot program information and the values of the specific variable and the reference variable are acquired from said variable area based on the output of said specific variable detection unit, stored in said trace area, and also output to said display unit.

2. The debugging system for robot program according to claim 1 further comprising:

an input unit which inputs a plurality of specific variable names and reference variable names as pursuit information for debugging; and a specific variable detection unit which detects that any one of the plurality of specific variables has been used in the robot program, wherein robot program information and the values of the specific variable and the reference variable are acquired from said variable area based on the output of said specific variable detection unit, stored in said trace area, and also output to said display unit.

3. The debugging system for robot program according to claim 1 further comprising:

a comparison buffer which stores the previously acquired robot program information and the values of a specific variable and a reference variable, wherein the robot program information and the values of the specific variable and the reference variable are acquired from said variable area on output of said specific variable detection unit, and the acquired data is compared with the robot program information and the values of the specific variable and reference variable which are stored in said comparison buffer, the data is replaced with a character string so that the data length is shorter when the values are the same as each other, the data with the shorter data length is stored in said trace area, and also displayed on said display unit.

4. The debugging system for robot program according to claim 3 further comprising:

a reconstruction unit which reconstructs the robot program information, the specific variable, and the reference variable, each consisting of a character string with a short data length stored in said trace area, to the full-length values, wherein the values reconstructed by said reconstruction unit are displayed on said display unit.

5. The debugging system for robot program according to claim 1 further comprising:

a trace omission unit which stops the execution of tracing within an iterations-instructed range for debugging of the robot program.

6. The debugging system for robot program according to claim 1 further comprising:

a trace omission unit which stops the execution of tracing within a range of specified program lines for debugging of the robot program.

7. The debugging system for robot program according to claim 1 further comprising:

a trace omission unit which stops the execution of tracing within a range of specified program numbers and step numbers for debugging of the robot program.

* * * * *

UNITED STATES PATENT AND TRADEMARK OFFICE
CERTIFICATE OF CORRECTION

PATENT NO.     : 6,289,264 B1
DATED          : September 11, 2001
INVENTOR(S)    : Hideo Zenke It is certified that error appears in the above-identified patent and that said Letters Patent is hereby corrected as shown below:

<u>Column 11 to Column 12,</u>
Beginning with lines 18-48 to lines 6-22, the claims are amended as follows:
1. A debugging system for robot program, which controls a robot based on instructions of robot program including variables by using a robot controller, and debugs the robot program, said debugging system comprising:
    an input unit which inputs a specific variable name and a reference variable name as pursuit information for debugging;
    a display unit which displays the pursuit information input by said input unit;
    a memory unit which contains a variable area that stores the variables, a pursuit information area that stores the pursuit information, a trace area that stores the result of debugging, a robot program area that stores a robot program entered by an operator, and a basic program area that stores a program executed by a processor; and
    a specific variable detection unit which detects that the specific variable has been used in the robot program,
    wherein robot program information is acquired from said robot program area, and the values of the specific variable and the reference variable are acquired from said variable area based on the output of said specific variable detection unit, said robot program information and said values are stored in said trace area, and also output to said display unit.

2. The debugging system for robot program according to claim 1 wherein:
    said input unit inputs a plurality of specific variable names and reference   variable names as pursuit information for debugging; and
    said specific variable detection unit detects that any one of the plurality of specific variables has been used in the robot program.

UNITED STATES PATENT AND TRADEMARK OFFICE
CERTIFICATE OF CORRECTION

PATENT NO. : 6,289,264 B1
DATED : September 11, 2001
INVENTOR(S) : Hideo Zenke

It is certified that error appears in the above-identified patent and that said Letters Patent is hereby corrected as shown below:

3. The debugging system for robot program according to claim 1 further comprising:
a comparison buffer which stores previously acquired robot program information and values of a specific variable and a reference variable,
wherein, whenever new robot program information and the values of the specific variable and the reference variable are acquired, the acquired data is compared with the previously acquired robot program information and values of the specific variable and reference variable which are stored in said comparison buffer, the acquired data is replaced with a character string so that a data length is shorter when the values are the same as each other, data with the shorter data length is stored in said trace area, and also displayed on said display unit.

Signed and Sealed this

Eighteenth Day of June, 2002

Attest:

Attesting Officer

JAMES E. ROGAN
*Director of the United States Patent and Trademark Office*